(12) United States Patent
Nakamura (10) Patent No.: US 9,598,236 B2
(45) Date of Patent: Mar. 21, 2017

(54) TRANSFER DEVICE (71) Applicant: MURATA MACHINERY, LTD., Kyoto-shi, Kyoto (JP)

(72) Inventor: Akitoshi Nakamura, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 55 days.

(21) Appl. No.: 14/423,502

(22) PCT Filed: Jul. 29, 2013

(86) PCT No.: PCT/JP2013/070481
§ 371 (c)(1),
(2) Date: Feb. 24, 2015

(87) PCT Pub. No.: WO2014/038308
PCT Pub. Date: Mar. 13, 2014

(65) Prior Publication Data
US 2015/0217935 A1    Aug. 6, 2015

(30) Foreign Application Priority Data

Sep. 5, 2012  (JP) .................................. 2012-195166

(51) Int. Cl.
*B65G 1/04* (2006.01)
(52) U.S. Cl.
CPC ......... *B65G 1/0435* (2013.01); *B65G 1/0421* (2013.01)
(58) Field of Classification Search
CPC ... B65G 1/0407; B65G 1/0435; B65G 1/0421
See application file for complete search history.

(56) References Cited

U.S. PATENT DOCUMENTS

| 5,839,872 A * | 11/1998 | Goto ................... B65G 1/0435 414/277 |
| 7,128,521 B2 * | 10/2006 | Hansl .................. B65G 1/0435 414/807 |
| 7,137,770 B2 * | 11/2006 | Ueda .................... B65G 1/0435 414/274 |

(Continued)

FOREIGN PATENT DOCUMENTS

| EP | 0733563 A1 * | 9/1996 | ........... B65G 1/0435 |
| EP | 1772400 A1 * | 4/2007 | ........... B65G 1/0407 |

(Continued)

*Primary Examiner* — James Keenan
(74) *Attorney, Agent, or Firm* — Keating & Bennett, LLP (57) ABSTRACT

A transfer device includes an arm and a controller. The arm includes a first hook capable of entering and exiting a first abutment position, a second hook capable of entering and exiting a second abutment position, and a third hook capable of entering and exiting a third abutment position. After the articles placed on the first and second placement areas are unloaded onto the shelf, the controller retracts the arm so that the second hook is spaced apart from the front end of the article unloaded from the first placement area and the rear end of the article unloaded from the second placement area, and removes the second hook from the second abutment position with the second hook being spaced apart from the front end of the article unloaded from the first placement area and from the rear end of the article unloaded from the second placement area.

4 Claims, 6 Drawing Sheets

(56) References Cited

U.S. PATENT DOCUMENTS

| | | | | |
|---|---|---|---|---|
| 8,596,952 B2* | 12/2013 | Wolkerstorfer | ...... | B65G 1/0435 414/280 |
| 8,740,542 B2* | 6/2014 | Wolkerstorfer | ...... | B65G 1/0435 414/280 |
| 8,790,061 B2* | 7/2014 | Yamashita | ........... | B65G 1/0492 414/280 |
| 9,365,347 B2* | 6/2016 | Nakamura | ........... | B65G 1/0407 |
| 2006/0245862 A1* | 11/2006 | Hansl | ................... | B65G 1/0435 414/281 |
| 2006/0285947 A1* | 12/2006 | Hansl | ................... | B65G 1/0407 414/277 |
| 2007/0144991 A1* | 6/2007 | Hansl | ................... | B65G 1/0407 211/121 |
| 2011/0008138 A1 | 1/2011 | Yamashita | | |
| 2015/0203294 A1* | 7/2015 | Yamada | ............... | B65G 1/0407 294/81.6 |
| 2015/0203295 A1* | 7/2015 | Nakamura | ........... | B65G 1/0435 414/274 |
| 2015/0321845 A1* | 11/2015 | Nakamura | ........... | B65G 1/0435 414/273 |

FOREIGN PATENT DOCUMENTS

| | | | | |
|---|---|---|---|---|
| JP | 11-29207 A | 2/1999 | | |
| JP | 2946281 B2 * | 9/1999 | ........... | B65G 1/0435 |
| JP | 2000-118625 A | 4/2000 | | |
| JP | 2011-207616 A | 10/2011 | | |
| WO | WO 94/04447 A1 * | 3/1994 | ........... | B65G 1/0407 |
| WO | WO 2011/158422 A1 * | 12/2011 | ........... | B65G 1/0407 |
| WO | 2012/029339 A1 | 3/2012 | | |

* cited by examiner

TRANSFER DEVICE

BACKGROUND OF THE INVENTION

1. Field of the Invention

The present invention relates to a transfer device configured to transfer an article to and from a shelf.

2. Description of the Related Art

As a transfer device for transferring an article to and from a shelf, for example, a transfer device that moves on rails extending along a plurality of shelves and that transfers the article to and from the shelves is known (see PCT Publication No. WO2012/029339, for example). Such a transfer device is provided with, for example, an arm that can stretch and retract in a front-and-rear direction and a pair of hooks that are spaced apart from each other in the front-and-rear direction. In this transfer device, the hooks can push and transfer the article, by stretching forward or retracting rearward the arm with the hooks abutting the article.

In the transfer device as described above, it is desired to transfer articles as efficiently as possible, by preventing occurrence of, for example, breakage and positional deviation of the articles.

SUMMARY OF THE INVENTION

Preferred embodiments of the present invention provide a transfer device that efficiently performs transfer.

A transfer device according to one aspect of various preferred embodiments of the present invention includes an arm configured to stretch forward along a front-and-rear direction to unload an article placed on at least one of a first placement area and a second placement area onto a shelf, the second placement area being positioned ahead of the first placement area, and to retract rearward along the front-and-rear direction to load the article placed on the shelf onto at least one of the first placement area and the second placement area; and a controller configured or programmed to control movement of the arm. The arm preferably includes a first hook configured to enter and exit a first abutment position that allows the first hook to abut the article, the first hook being configured to enter the first abutment position to abut a rear end of the article placed on the first placement area when unloading the article placed on the first placement area onto the shelf; a second hook configured to enter and exit a second abutment position that allows the second hook to abut the article, the second hook being configured to enter the second abutment position to abut the rear end of the article placed on the second placement area when unloading the article placed on the second placement area onto the shelf, and to enter the second abutment position to abut a front end of the article placed on the shelf when loading the article placed on the shelf onto the first placement area; and a third hook configured to enter and exit a third abutment position that allows the third hook to abut the article, the third hook being configured to enter the third abutment position to abut the front end of the article placed on the shelf when loading the article placed on the shelf onto the second placement area. After the article placed on the first placement area is unloaded onto the shelf and the article placed on the second placement area is unloaded onto the shelf, the controller retracts the arm so that the second hook is spaced apart from the front end of the article unloaded onto the shelf from the first placement area and the second hook is spaced apart from the rear end of the article unloaded onto the shelf from the second placement area, and removes the second hook from the second abutment position with the second hook being spaced apart from the front end of the article unloaded onto the shelf from the first placement area and with the second hook being spaced apart from the rear end of the article unloaded onto the shelf from the second placement area.

In this transfer device, the arm includes the second hook located between the first hook and the third hook. This enables two articles to be simultaneously transferred from and to the shelf. After the loads are unloaded onto the shelf by the first hook and the second hook, the controller retracts the arm to a position where the second hook does not abut each article, and removes the second hook from the second abutment position. This prevents each article from getting caught by the second hook, thus preventing, for example, breakage and positional deviation of the articles. Thus, transfer is efficiently performed without stopping the operation of the transfer device.

The controller may preferably be configured or programmed to store a position of the arm where the second hook enters the second abutment position when two articles placed on the shelf are simultaneously loaded onto the first placement area and the second placement area, respectively, and to retract the arm to the stored position after the article placed on the second placement area is unloaded onto the shelf. When the two articles placed on the shelf are simultaneously loaded onto the first placement area and the second placement area, respectively, the second hook enters the second abutment position while avoiding abutting each load. In one aspect of various preferred embodiments of the present invention, the position of the arm at this time is stored. After the article placed on the second placement area is unloaded onto the shelf, the arm is retracted to the stored position. This makes it possible to more surely prevent the article from getting caught by the second hook. Thus, transfer is more efficiently performed.

The arm may include an article detection sensor configured to detect the rear end of the article placed on the shelf, in a position between the second hook and the third hook in the front-and-rear direction, the position being near the second hook. The controller preferably is configured or programmed to retract the arm until the article detection sensor detects the rear end of the article placed on the shelf, after the article placed on the second placement area is unloaded onto the shelf. In this case, a state in which the second hook does not abut the article is quickly detected. This enables the amount of movement of the arm to be reduced.

After the article placed on the first placement area is unloaded onto the shelf and the article placed on the second placement area is unloaded onto the shelf, the controller preferably is configured or programmed to retract the arm so that the second hook is spaced apart from the front end of the article unloaded onto the shelf from the first placement area and the second hook is spaced apart from the rear end of the article unloaded onto the shelf from the second placement area. The controller preferably is configured or programmed to remove the second hook from the second abutment position, after the arm stops retracting with the second hook being spaced apart from the front end of the article unloaded onto the shelf from the first placement area and with the second hook being spaced apart from the rear end of the article unloaded onto the shelf from the second placement area. In this case, it is possible to preferably prevent contact between the second hook and the article unloaded onto the shelf from the first placement area by the first hook.

Various preferred embodiments of the present invention makes it possible to provide a transfer device that performs safe transfer.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of transfer devices of the present invention will now be described in detail with reference to the drawings. Like reference signs indicate like or corresponding components, and duplicated description is omitted.

Figure 1:
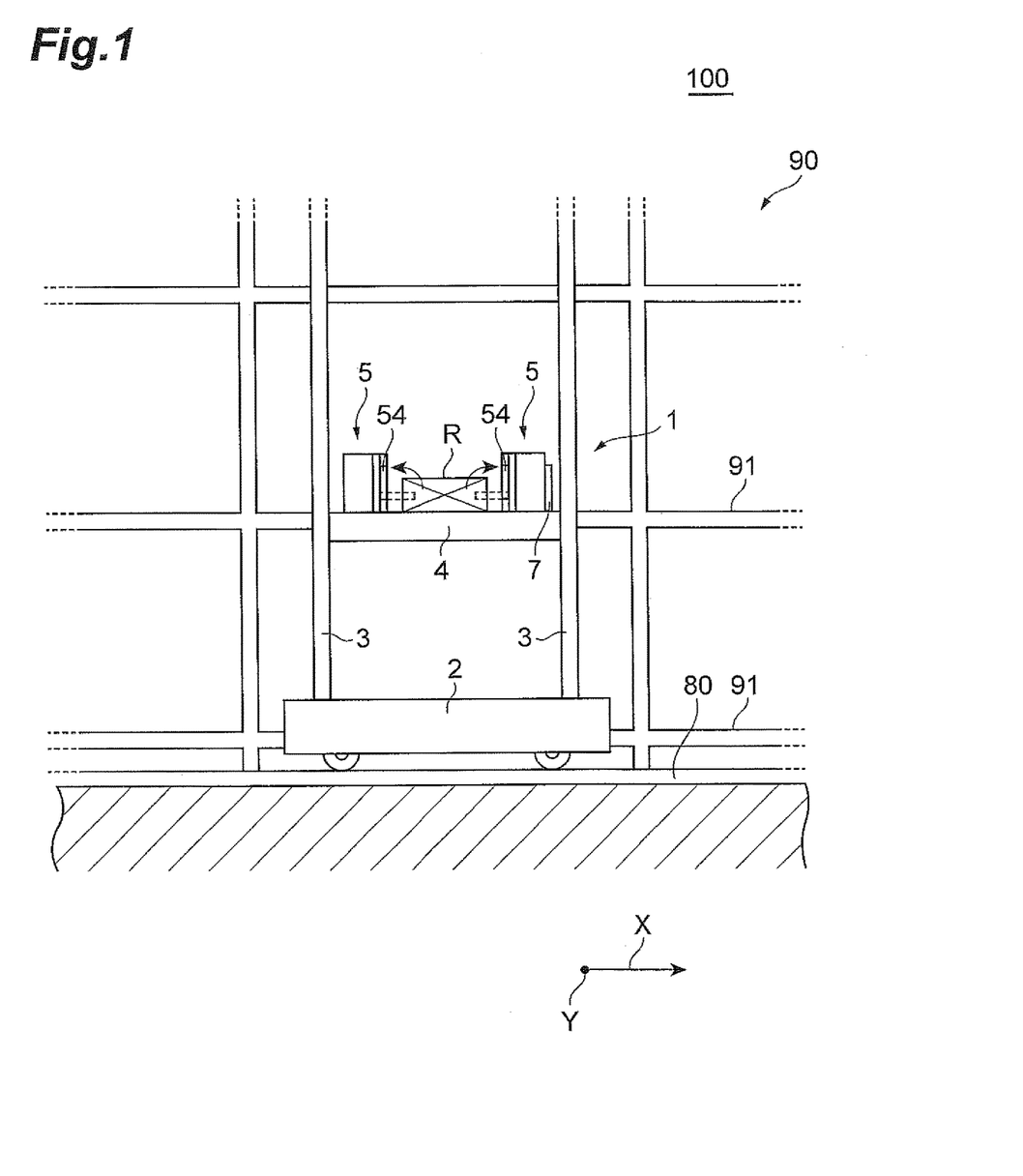
FIG. 1 is a front view of a transfer device according to a preferred embodiment of the present invention.
Figure 2:
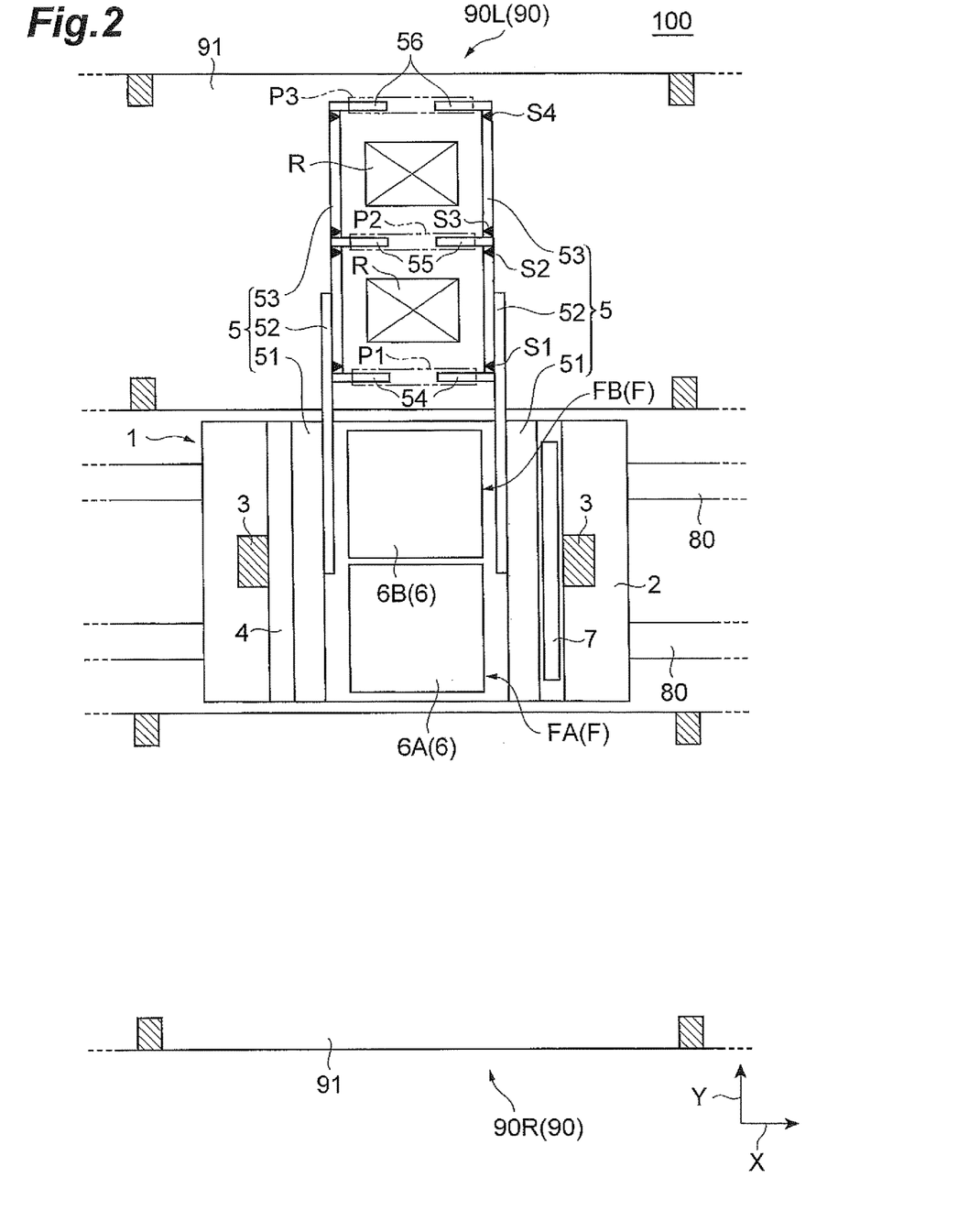
FIG. 2 is a plan view of the transfer device of FIG. 1.

FIG. 1 is a front view of a transfer device according to a preferred embodiment of the present invention, and FIG. 2 is a plan view of the transfer device of FIG. 1. As depicted in FIGS. 1 and 2, a stacker crane (transfer device) 1 is, for example, arranged in a building 100, and transfers an article R such as containers or cardboard boxes to or from a rack 90.

The rack 90 stores the article R. A plurality of racks 90 is provided in the building 100. Each rack 90 extends in a predetermined X-direction (horizontal direction). Neighboring racks 90L and 90R are arranged in parallel or approximately parallel facing each other. In each rack 90, a plurality of shelves 91 storing the article R extends along the X-direction and the vertical direction. In the racks 90, the article R is brought in and out from an area between the opposing racks 90L and 90R. On the area between the opposing racks 90L and 90R, rails 80 for the stacker crane 1 to travel thereon are provided.

The stacker crane 1 brings in and out the article R onto and from the shelves 91. The stacker crane 1 is arranged in the area between the opposing racks 90L and 90R. The stacker crane 1 includes a traveling truck 2 that travels along the rails 80, two supporting devices 3 and 3 that are erected on the traveling truck 2, and a lifting platform 4 that ascends and descends along the supporting devices 3 and 3. The stacker crane 1 moves in the X-direction along the racks 90 by traveling along the rails 80. This movement enables the stacker crane 1 to bring in and out the article R onto and from the shelves 91 that are provided along the X-direction. The stacker crane 1 raises and lowers the lifting platform 4, thus being capable of bringing in and out article R onto and from the shelves 91 that are provided along the vertical direction.

Because transfer between the stacker crane 1 and the rack 90L and transfer between the stacker crane 1 and the rack 90R are performed in the same manner, the transfer between the stacker crane 1 and the rack 90L will be described hereinafter. The direction that is a horizontal direction and is perpendicular or substantially perpendicular to the X-direction is the Y-direction (front-and-rear direction). In the Y-direction, the side of the rack 90L is the front side, and the side of the stacker crane 1 is the rear side.

The stacker crane 1 includes a placement area F, on the lifting platform 4, on which the article R is placed. The placement area F includes a placement area (first placement area) FA provided on the rear side and a placement area (second placement area) FB provided on the front side. The stacker crane 1 transfers the article R onto and from the shelf 91 positioned ahead of the placement area FB. On each of the placement area FA and the placement area FB, the article R can be placed. The stacker crane 1 includes a pair of arms 5 and 5, a conveyor 6, and a controller 7 on the lifting platform 4.

The pair of the arms 5 and 5 are spaced apart from each other along the X-direction. The arm 5 extends along the Y-direction, and is configured to stretch and retract along the Y-direction. Specifically, the arm 5 includes a telescopic structure including a base portion 51, a middle portion 52, and a top portion 53. The base portion 51, the middle portion 52, and the top portion 53 each include a member extending along the Y-direction.

When the middle portion 52 is advanced toward a shelf 91 side with respect to the base portion 51 by a drive source, in conjunction with this movement, the top portion 53 is advanced toward the shelf 91 side with respect to the middle portion 52. In other words, the arm 5 stretches forward along the Y-direction. When the middle portion 52 is retreated from the shelf 91 side with respect to the base portion 51 by the drive source, in conjunction with this movement, the top portion 53 is retreated from the shelf 91 side with respect to the middle portion 52. In other words, the arm 5 retracts rearward along the Y-direction.

The top portion 53 includes a hook (first hook) 54, a hook (second hook) 55, and a hook (third hook) 56 that are used to move the article R. The hook 54 is provided to a rear end of the top portion 53 in the Y-direction. The hook 55 is provided to a middle of the top portion 53 in the Y-direction. The hook 56 is provided to a front end of the top portion 53 in the Y-direction.

The hook 54 is configured to be rotated about an axis line parallel or substantially parallel to the Y-direction by a drive source. This rotation enables the hook 54 to enter and exit an abutment position (first abutment position) P1 where the hook 54 abuts the article R. When unloading the article R placed on the placement area FA onto the shelf 91, the hooks 54 and 54 enter the abutment position P1 and abut the rear end of the article R placed on the placement area FA. By stretching the arms 5 and 5 forward from this state, the article R placed on the placement area FA is unloaded onto the shelf 91.

The hook 55 is configured to be rotated about an axis line parallel or substantially parallel to the Y-direction by a drive source. This rotation enables the hook 55 to enter and exit an abutment position (second abutment position) P2 where the hook 55 abuts the article R. When unloading the article R placed on the placement area FB onto the shelf 91, the hooks 55 and 55 enter the abutment position P2, and abut the rear end of the article R placed on the placement area FB. By stretching the arms 5 and 5 forward from this state, the article R placed on the placement area FB is unloaded onto the shelf 91.

When loading the article R placed on the shelf 91 onto the placement area FA, the hooks 55 and 55 enter the abutment position P2, and abut the front end of the article R placed on the shelf 91. By retracting the arms 5 and 5 rearward from this state, the article R placed on the shelf 91 is loaded onto the placement area FA.

The hook 56 is configured to be rotated about an axis line parallel to the Y-direction by a drive source. This rotation enables the hook 55 to enter and exit an abutment position (third abutment position) P3 where the hook 56 abuts the article R. When loading the article R placed on the shelf 91 onto the placement area FB, the hooks 56 and 56 enter the abutment position P3, and abut the front end of the article R placed on the shelf 91. By retracting the arms 5 and 5 rearward from this state, the article R placed on the shelf 91 is loaded onto the placement area FB.

The top portion 53 includes load detection sensors S1 to S4 for detecting the article R. The article detection sensors S1 to S4 preferably include, for example, light sensors, and each of which includes a light-emitting portion provided to one of the arms 5 and a light-receiving portion provided to the other of the arms 5. The article detection sensor S1 is arranged in a position between the hook 54 and the hook 55 in the Y-direction, the position being near the hook 54 (position slightly ahead of the hook 54). The article detection sensor S2 is arranged in a position between the hook 54 and the hook 55 in the Y-direction, the position being near the hook 55 (position slightly in the rear of the hook 55). The article detection sensor S3 is arranged in a position between the hook 55 and the hook 56 in the Y-direction, the position being near the hook 55 (position slightly ahead of the hook 55). The article detection sensor S4 is arranged in a position between the hook 55 and the hook 56 in the Y-direction, the position being near the hook 56 (position slightly in the rear of the hook 56).

The conveyor 6 is provided at the placement area F, and moves the article R along the Y-direction. The conveyor 6 includes a conveyor (first conveyor) 6A provided in the placement area FA and a conveyor (second conveyor) 6B provided in the placement area FB. The conveyor 6A and the conveyor 6B each are provided below the arms 5.

The controller 7 is configured or programmed to control movement of each component of the stacker crane 1. The controller 7 preferably includes an electronic control unit including a CPU, a ROM, and a RAM, for example. To the controller 7, information required to perform control is input from each component of the stacker crane 1. The controller 7 loads a program stored in the ROM into the RAM for the CPU to execute the program, thus configuring each processor with software. Herein, each processor may be configured with hardware.

The following describes movement of the stacker crane 1.

FIGS. 3A, 3B, 4A and 4B are plan views illustrating movement when the transfer device of FIG. 1 unloads the articles onto a shelf. With reference to FIGS. 3A, 3B, 4A and 4B, movement when an article R1 placed on the placement area FA and an article R2 placed on the placement area FB are simultaneously unloaded onto the shelf 91 will be described.

Figure 3A:
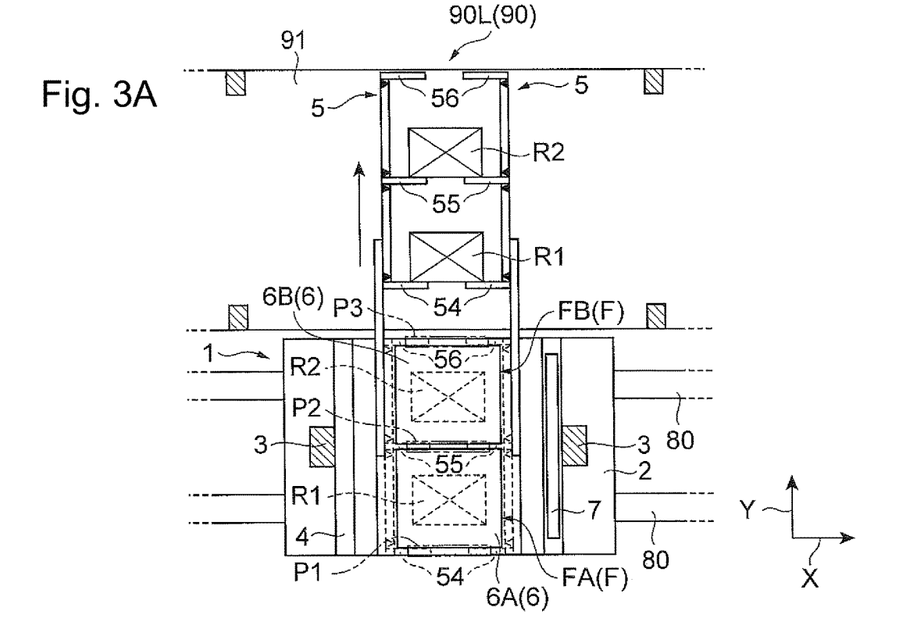
FIGS. 3A and 3B are plan views illustrating movement when the transfer device of FIG. 1 unloads articles onto a shelf.

To begin with, as depicted in FIG. 3A, the controller 7 moves the hooks 54 and 54 to the abutment position P1, moves the hooks 55 and 55 to the abutment position P2, and moves the hooks 56 and 56 to the abutment position P3. From this state, the arms 5 and 5 are stretched forward to simultaneously unload the articles R1 and R2 onto the shelf 91. At this time, the hooks 56 and 56 do not have to be moved to the abutment position P3.

Figure 3B:
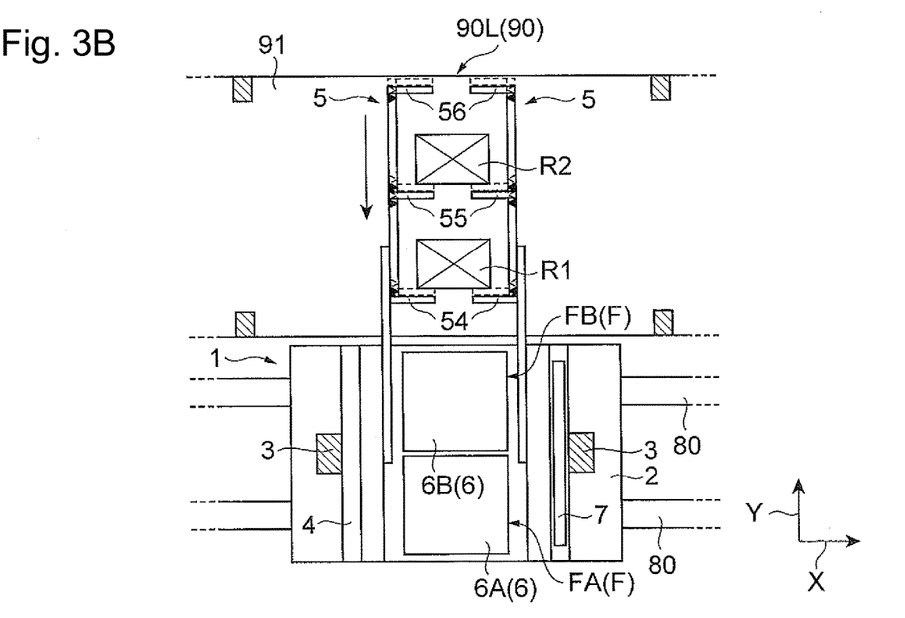

Subsequently, as depicted in FIG. 3B, the controller 7 retracts the arms 5 rearward so that the hooks 54 and 54 are separated from the rear end of the article R1 and the hooks 55 and 55 are separated from the rear end of the article R2.

Figure 5:
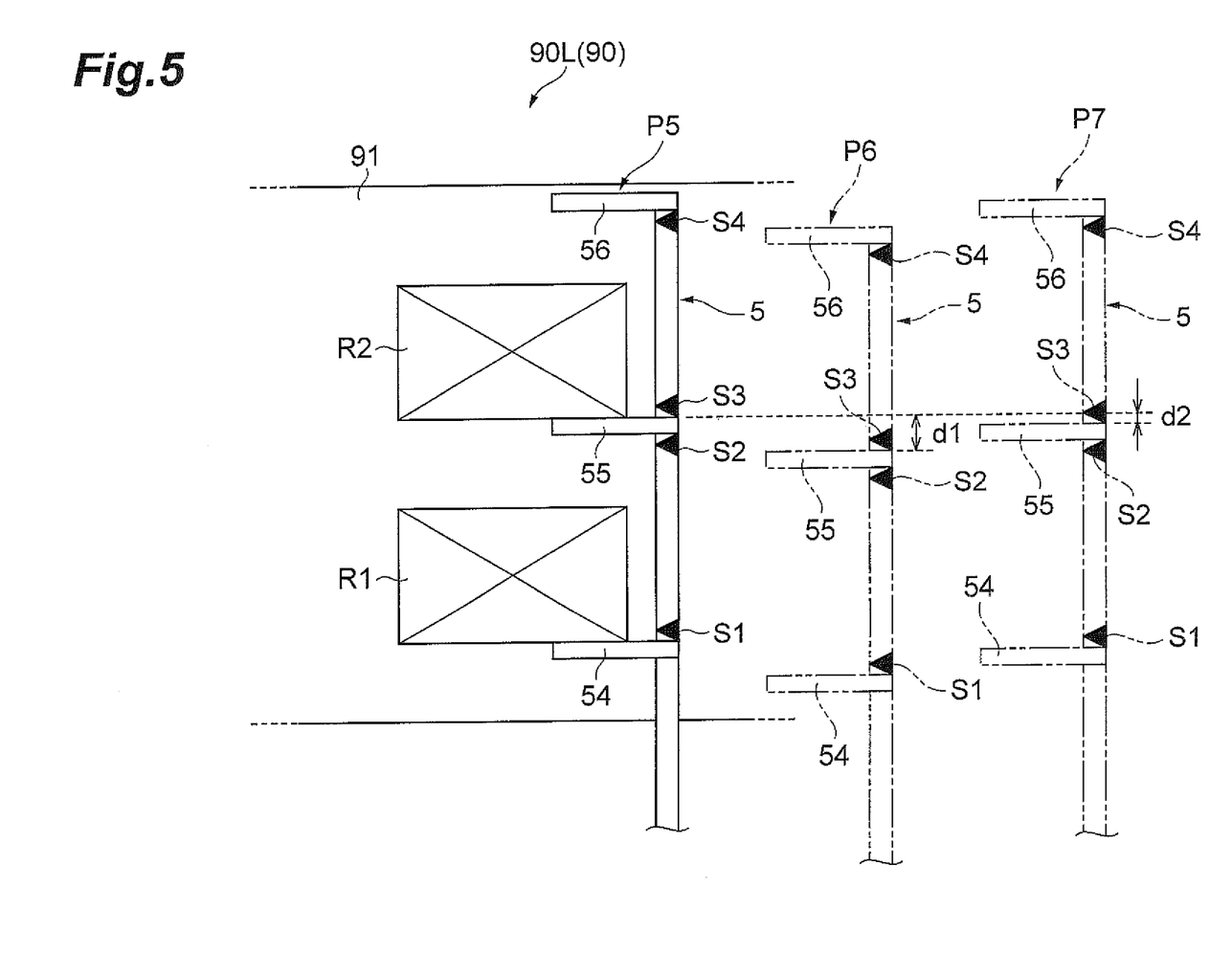
FIG. 5 is a plan view illustrating the position of an arm when a second hook is spaced apart from the rear end of an article.

Herein, FIG. 5 is a plan view illustrating the position of an arm when the second hook is spaced apart from the rear end of the article. FIG. 5 illustrates only one of the arms 5. In FIG. 5, the arm 5 in positions P6 and P7 is illustrated to be in positions shifted in the X-direction for the purpose of explanation.

As depicted in FIG. 5, the position P5 is the position of the arm 5 where the arm 5 is started to be retracted after the articles R1 and R2 are unloaded onto the shelf 91. In the position P5, the hook 54 abuts the rear end of the article R1 and the hook 55 abuts the rear end of the article R2.

The position P6 is the position of the arm 5 where the hook 54 enters the first abutment position, the hook 55 enters the second abutment position, and the hook 56 enters the third abutment position, when the articles R1 and R2 placed on the shelf 91 are loaded onto the placement area FA and the placement area FB, respectively. Specifically, the position P6 is the position of the arm 5 where the arm 5 starts retracting when the articles R1 and R2 placed on the shelf 91 are loaded onto the placement area FA and the placement area FB, respectively. In the position P6, the hook 54 is spaced apart from the front end of the article R1, the hook 55 is spaced apart from the rear end of the article R1 and is spaced apart from the front end of the article R2, and the hook 56 is spaced apart from the rear end of the article R2. The controller 7 preferably is configured or programmed to store the position P6. At this time, the hook 54 does not have to be moved to the abutment position P1.

When separating the hook 55 from the rear end of the article R2, the controller 7 retracts the arm 5 from the position P5 to the position P6 that is stored in advance, and stops retracting the arm 5 at the position P6. This separates the hooks 54 and 54 from the rear end of the article R1 and separates the hooks 55 and 55 from the rear end of the article R2. At this time, the retracting amount of the arm 5 is a distance d1.

Figure 4A:
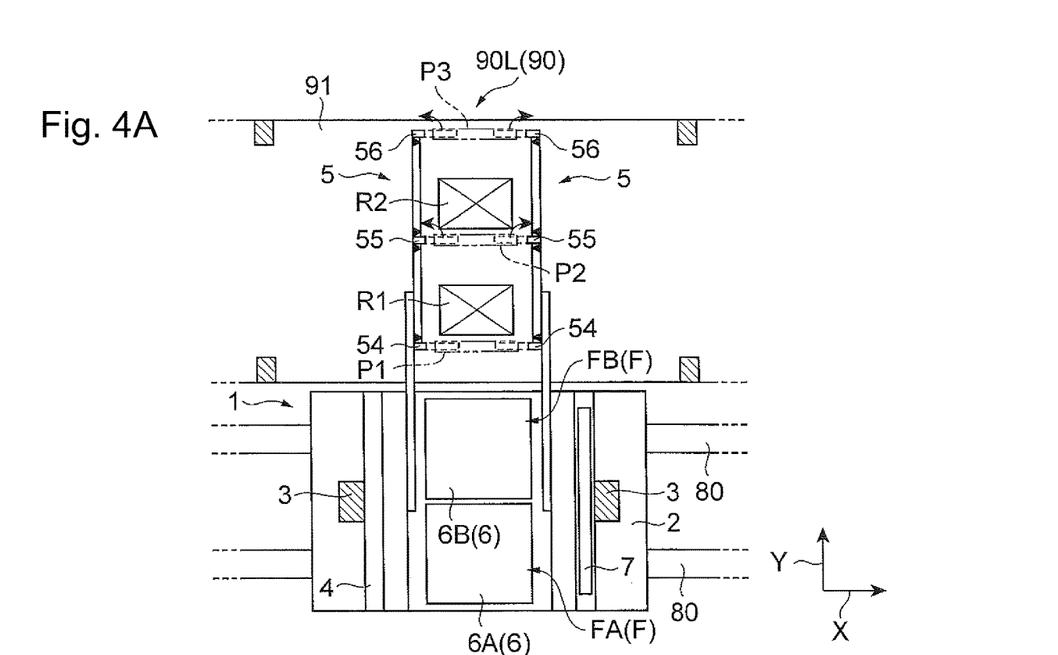
FIGS. 4A and 4B are plan views illustrating movement when the transfer device of FIG. 1 unloads articles onto a shelf.

Subsequently, as depicted in FIG. 4A, the controller 7 removes the hooks 54 and 54 from the abutment position P1, removes the hooks 55 and 55 from the abutment position P2, and removes the hooks 56 and 56 from the abutment position P3, with the hooks 54 and 54 being spaced apart from the rear end of the article R1 and with the hooks 55 and 55 being spaced apart from the rear end of the article R2.

Figure 4B:
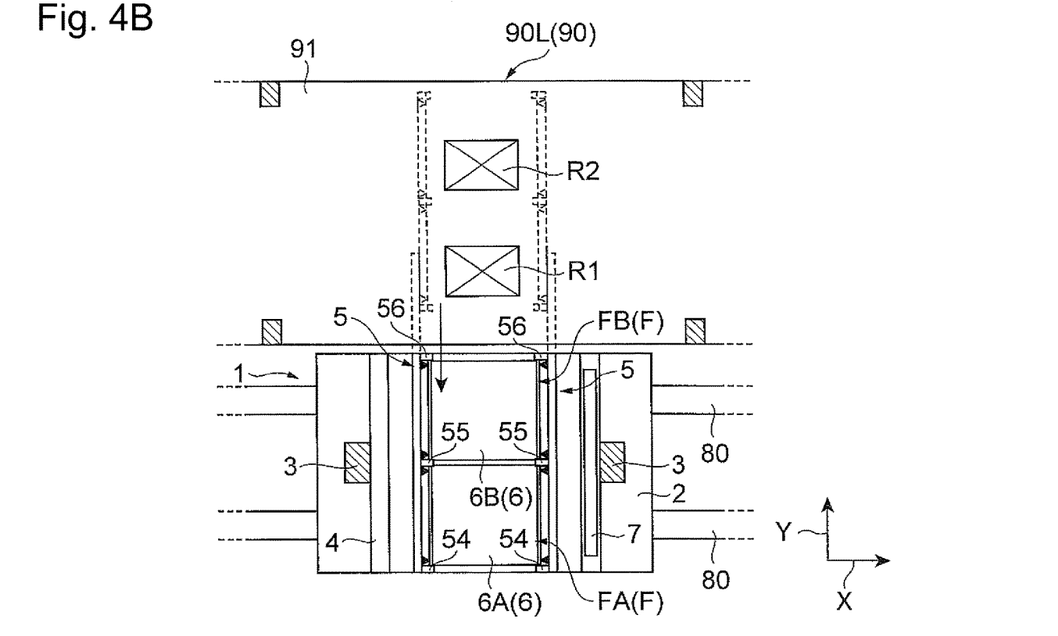

Subsequently, as depicted in FIG. 4B, the controller 7 retracts the arms 5 rearward, and thus a series of operations end.

As described above, in the stacker crane 1 of the present preferred embodiment, the arm 5 includes the hook 55 between the hook 54 and the hook 56. This enables two loads R1 and R2 to be simultaneously transferred from and to the shelf 91. After the articles R1 and R2 are unloaded onto the shelf 91 by the hooks 54 and 55, the controller 7 retracts the arm 5 to a position where the hook 55 does not abut the articles R1 and R2, and removes the hook 55 from the abutment position P2. This prevents the articles R1 and R2 from getting caught by the hook 55, thus preventing, for example, breakage and positional deviation of the articles R1 and R2. Thus, transfer is efficiently performed without stopping the operation of the stacker crane 1.

In the stacker crane 1, the controller 7 preferably is configured or programmed to store the position P6 of the arm 5 where the hook 55 enters the abutment position P2 when the two loads R1 and R2 placed on the shelf 91 are simultaneously loaded onto the placement area FA and the placement area FB, respectively. The controller 7 retracts the arm 5 to the stored position P6 after the article R2 placed on the placement area FB is unloaded onto the shelf 91. As described above, when the two loads R1 and R2 placed on the shelf 91 are simultaneously loaded onto the placement area FA and the placement area FB, respectively, the hook 55 enters the abutment position P2 while avoiding abutting the articles R1 and R2. In the stacker crane 1, the position P6 of the arm 5 at this time is stored. After the article R2 placed on the placement area FB is unloaded onto the shelf 91, the arm 5 is retracted to the point P6 stored in advance. This makes it possible to more surely prevent the article R2 from getting caught by the hook 55, and thus safer transfer is performed. Furthermore, retracting the arm 5 to the position P6 stored in advance enables the retracting amount of the arm 5 to be easily set.

In the stacker crane 1, after the article R1 placed on the placement area FA is unloaded onto the shelf 91 and the article R2 placed on the placement area FB is unloaded onto the shelf 91, the controller 7 retracts the arm 5 so that the hook 55 is spaced apart from the front end of the article R1 and the hook 55 is spaced apart from the rear end of the article R2. The controller 7 then stops retracting the arm 5 with the hook 55 being spaced apart from the front end of the article R1 and with the hook 55 being spaced apart from the rear end of the article R2, and removes the hook 55 from the abutment position P2. Thus, it is possible to preferably prevent contact between the hook 55 and the article R1 unloaded onto the shelf 91 from the placement area FA by the hook 54.

Preferred embodiments of the transfer device of the present invention have been described in the foregoing, but the present invention is not limited to the above-described preferred embodiments. For example, in the above-described preferred embodiments, the controller 7 preferably is configured or programmed to retract the arm 5 to the position P6 stored in advance when separating the hook 55 from the rear end of the article R2. However, the controller 7 may be configured or programmed to retract the arm 5 based on signals from the article detection sensors.

Specifically, when the hook 55 is separated from the rear end of the article R2, in the position P7 depicted in FIG. 5, the article detection sensor S3 changes from a detection state to a non-detection state and detects the rear end of the article R2. The controller 7 may retract the arm 5 until the article detection sensor S3 detects the rear end of the article R2, and stops retracting the arm 5 at the position P7. In this case, the retracting amount of the arm 5 is a distance d2 that is shorter than the distance d1, and accordingly the state in which the hook 55 does not abut the article R2 is quickly detected. Thus, the amount of movement of the arm 5 is reduced.

Figure 6:
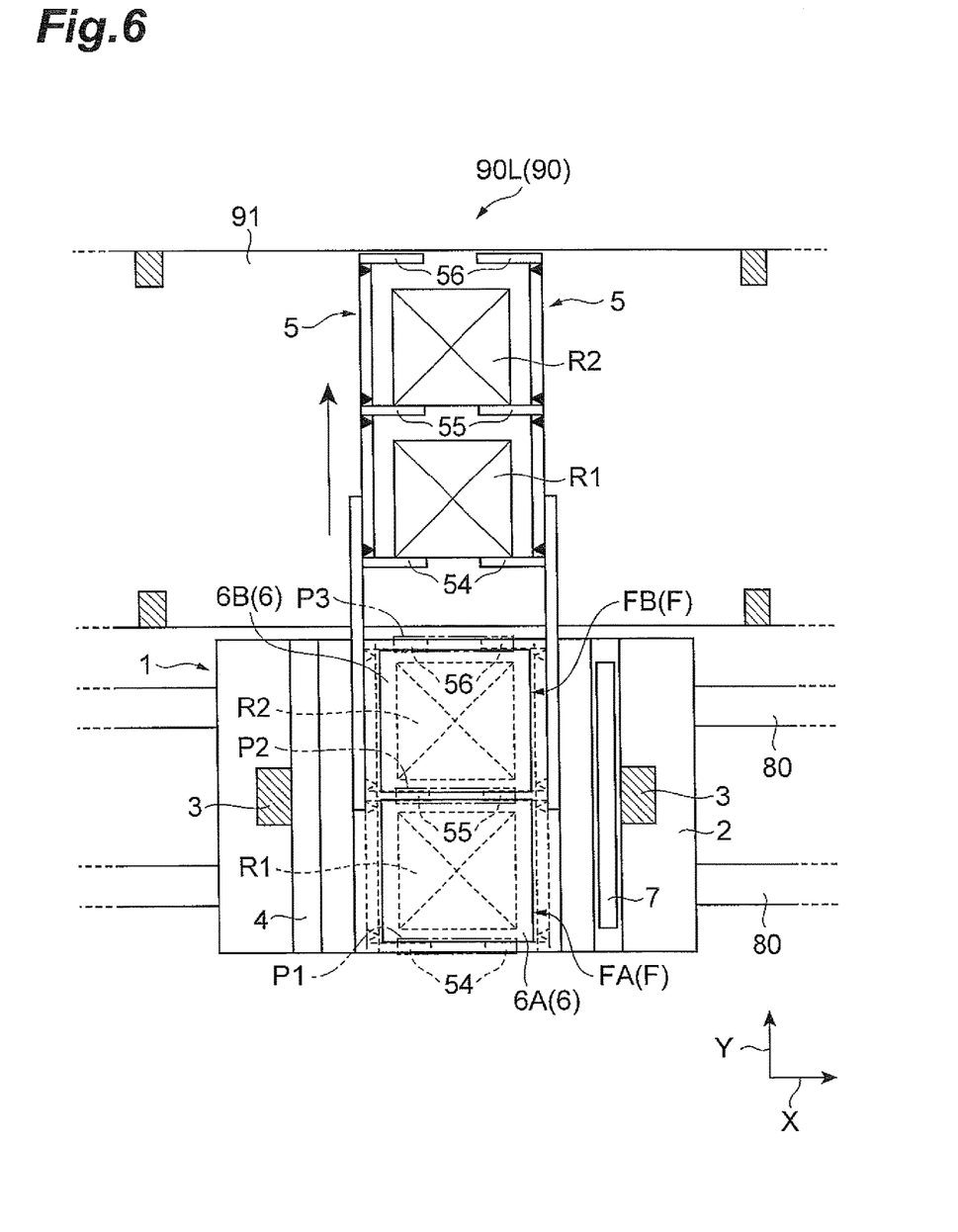
FIG. 6 is a plan view illustrating movement when the transfer device of FIG. 1 unloads articles onto a shelf.

In the above-described preferred embodiments, after the retracting of the arm 5 is once stopped with the hook 55 being spaced apart from the rear end of the article R2, the hook 55 preferably is removed from the abutment position P2. However, if the spacing between the front end of the article R1 and the hook 55 and the spacing between the rear end of the article R2 and the hook 55 is sufficiently secured, the hook 55 may be removed from the abutment position P2 with the arm 5 being retracted. In this case, the time required for the transfer is shortened. In the above-described preferred embodiments, the spacing between the front end of the article R1 and the hook 55 and the spacing between the rear end of the article R2 and the hook 55 are relatively large (see FIGS. 2 to 5). However, in practical use, as depicted in FIG. 6, there are occasions when the articles R1 and R2 are larger than those of the above-described preferred embodiments, and accordingly the spacing between the front end of the article R1 and the hook 55 and the spacing between the rear end of the article R2 and the hook 55 are smaller.

In the above-described preferred embodiments, transfer between the stacker crane 1 and the rack 90L has been described. However, transfer may be performed between the stacker crane 1 and the rack 90R. In this case, it is assumed that the side of the rack 90R is the front side and the side of the stacker crane 1 is the rear side, in the Y-direction. It is also assumed that the placement area FB is the first placement area and the placement area FA is the second placement area. In addition, the hook 56 defines and functions as the first hook, and the hook 54 functions as the third hook. It is also assumed that the abutment position P3 is the first abutment position and the abutment position P1 is the third abutment position. In addition, the conveyor 6B defines and functions as the first conveyor, and the conveyor 6A defines and functions as the second conveyor.

Preferred embodiments of the present invention make it possible to provide a transfer device that performs safe transfer.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A transfer device comprising:
an arm configured to stretch forward along a front-and-rear direction to unload an article placed on at least one of a first placement area and a second placement area onto a shelf, the second placement area being positioned ahead of the first placement area, and configured to retract rearward along the front-and-rear direction to load the article placed on the shelf onto at least one of the first placement area and the second placement area; and
a controller configured or programmed to control movement of the arm; wherein the arm includes:
  a first hook configured to enter and exit a first abutment position that allows the first hook to abut the article, the first hook being configured to enter the first abutment position to abut a rear end of the article placed on the first placement area when unloading the article placed on the first placement area onto the shelf;
  a second hook configured to enter and exit a second abutment position that allows the second hook to abut the article, the second hook being configured to enter the second abutment position to abut the rear end of the article placed on the second placement area when unloading the article placed on the second placement area onto the shelf, and enter the second abutment position to abut a front end of the article placed on the shelf when loading the article placed on the shelf onto the first placement area; and
  a third hook configured to enter and exit a third abutment position that allows the third hook to abut the article, the third hook being configured to enter the third abutment position to abut the front end of the article placed on the shelf when loading the article placed on the shelf onto the second placement area;
the controller is configured or programmed to store a relative position of the arm with respect to the article on the second placement area where the second hook enters the second abutment position;

the controller is configured or programmed to retract the arm to the stored relative position of the arm with respect to the article after the article placed on the first placement area is unloaded onto the shelf and the article placed on the second placement area is unloaded onto the shelf, such that the second hook is spaced apart from the front end of the article unloaded onto the shelf from the first placement area and the second hook is spaced apart from the rear end of the article unloaded onto the shelf from the second placement area; and the controller is configured or programmed to remove the second hook from the second abutment position with the second hook being spaced apart from the front end of the article unloaded onto the shelf from the first placement area and with the second hook being spaced apart from the rear end of the article unloaded onto the shelf from the second placement area.

2. The transfer device according to claim 1, wherein the controller is configured or programmed to remove the second hook from the second abutment position after the arm stops retracting.

3. A transfer device comprising:

an arm configured to stretch forward along a front-and-rear direction to unload an article placed on at least one of a first placement area and a second placement area onto a shelf, the second placement area being positioned ahead of the first placement area, and configured to retract rearward along the front-and-rear direction to load the article placed on the shelf onto at least one of the first placement area and the second placement area; and a controller configured or programmed to control movement of the arm; wherein the arm includes:

a first hook configured to enter and exit a first abutment position that allows the first hook to abut the article, the first hook being configured to enter the first abutment position to abut a rear end of the article placed on the first placement area when unloading the article placed on the first placement area onto the shelf;

a second hook configured to enter and exit a second abutment position that allows the second hook to abut the article, the second hook being configured to enter the second abutment position to abut the rear end of the article placed on the second placement area when unloading the article placed on the second placement area onto the shelf, and enter the second abutment position to abut a front end of the article placed on the shelf when loading the article placed on the shelf onto the first placement area;

a third hook configured to enter and exit a third abutment position that allows the third hook to abut the article, the third hook being configured to enter the third abutment position to abut the front end of the article placed on the shelf when loading the article placed on the shelf onto the second placement area; and an article detection sensor configured to detect the rear end of the article placed on the shelf, in a position between the second hook and the third hook in the front-and-rear direction;

the controller is configured or programmed to retract the arm until the article detection sensor detects the rear end of the article placed on the shelf, after the article placed on the first placement area is unloaded onto the shelf and the article placed on the second placement area is unloaded onto the shelf, such that the second hook is spaced apart from the front end of the article unloaded onto the shelf from the first placement area and the second hook is spaced apart from the rear end of the article unloaded onto the shelf from the second placement area; and the controller is configured or programmed to remove the second hook from the second abutment position with the second hook being spaced apart from the front end of the article unloaded onto the shelf from the first placement area and with the second hook being spaced apart from the rear end of the article unloaded onto the shelf from the second placement area.

4. The transfer device according to claim 3, wherein the controller is configured or programmed to remove the second hook from the second abutment position after the arm stops retracting.

* * * * *